Patented Dec. 11, 1945

2,390,648

UNITED STATES PATENT OFFICE 2,390,648

MANUFACTURE OF SULPHAMIC ACID

Donald P. Hill, Wilmington, Del., and George A. Peirce, Westfield, N. J., assignors to E. I. du Pont de Nemours & Company, Wilmington, Del., a corporation of Delaware No Drawing. Application November 6, 1943, Serial No. 509,276

10 Claims. (Cl. 23—166)

This invention relates to the manufacture of sulphamic acid and is directed to processes in which a liquid pre-reaction mixture is prepared by bringing together urea and oleum of at least 45% strength in a liquid reaction medium made up of one or more components of the reaction in the proportion to give substantially one mole of sulphuric acid for each mole of urea while effecting cooling throughout the liquid reaction medium adequate to inhibit the formation of sulphamic acid and to maintain the pre-reaction mixture in a liquid condition and in which the pre-reaction mixture is thereafter converted to sulphamic acid.

It has been heretofore known that sulphamic acid can be produced from urea, sulphur trioxide and sulphuric acid. See U. S. Patent 2,102,350, German Patent 636,329, German Patent 641,238 and U. S. Patent 2,191,754. It is known that the reactions involved are strongly exothermic and that precautions must be taken to insure adequate dissipation of the heat of the reaction which otherwise might proceed with undue violence. According to German Patent 641,238 it is proposed to add urea to oleum slowly and with cooling and thereafter to heat the reaction mixture to cause the sulphamic acid to precipitate. To effect this result an excess of sulphuric acid is utilized. Thus whereas the theoretical proportions are one mole of urea to one mole of sulphuric acid to one mole of sulphur trioxide, Example 1 of German Patent 641,238 utilizes sulphuric acid in the proportion of five times the theoretical and sulphur trioxide in the proportion of three times the theoretical. Thus the sulphuric acid is substantially in excess of both the theoretical amounts of urea and sulphur trioxide and as a result the reaction is carried out throughout in a liquid phase and the resulting sulphamic acid is precipitated in this liquid medium.

Because of the difficulties encountered in separating crystals of sulphamic acid from strong sulphuric acid solutions it is desirable so to proportion the constituents that the final product is obtained as a dry product. Thus if the theoretical proportions are utilized, theoretically at least there should be obtained sulphamic acid as such. In practice, however, it is found that this is not necessarily the case because there are other reactions, which take place especially if the temperature is allowed to become too high, which result in other products such as ammonium bisulphate. Also, because of the difficulty of dissipating the heat of the reaction it is difficult if not impossible by ordinary methods to obtain any product at all if the combining proportions of the reagents are utilized.

We have now found that sulphamic acid can be produced in high yields and directly as a dry product by preparing a liquid pre-reaction mix by bringing together urea and oleum of at least 45% strength in a liquid reaction medium made up of at least one of the components of the reaction in the proportions to give substantially one mole of sulphuric acid for each mole of urea while effecting cooling adequate to inhibit formation of sulphamic acid and to keep the pre-reaction mixture in a liquid state and thereafter converting the pre-reaction mixture to sulphamic acid.

By the processes of our invention we obtain all the advantages which can be attributed to a process for producing the product dry and at the same time obtain the advantages of the high cooling efficiency which may be obtained with a liquid medium. In forming the liquid pre-reaction mixture so much heat is liberated that the subsequent step of converting the pre-reaction mixture to sulphamic acid proceeds easily and effectively to give a dry product without the complications of having to abstract heat from a strongly exothermic reaction in a dry state.

It appears that the reaction which takes place between urea and oleum resulting in the formation of sulphamic acid takes place in two stages in the first of which the urea reacts with sulphur trioxide to form carbamido monosulphonic acid and in the second of which the carbamido monosulphonic acid reacts with the sulphuric acid to give sulphamic acid. These reactions are thought to proceed according to the following equations:

1 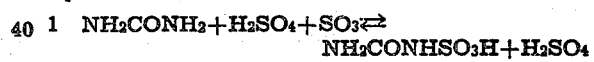

2 

These of course are not all the reactions which may take place when urea and oleum are brought together. For example, the urea and sulphuric acid may react to form urea bisulphate and as a matter of fact this reaction takes place when sulphuric acid and urea are combined prior to introduction of the $SO_3$. Depending, therefore, upon how the reaction is carried out one or more of these three possible reactions, and possibly other reactions, may proceed simultaneously though possibly with different velocities.

It is the purpose of this invention so to carry out the reaction during the pre-mixing stage as to suppress all the reactions save the first one. The pre-reaction mixture to remain in the liquid state must not contain too much sulphamic acid and of course sulphamic acid formation because of the additional heat of reaction liberated makes it more difficult to control temperatures in the pre-reaction stage. Similarly the formation of urea bisulphate is desirably suppressed because otherwise there would be two types of reactions involved, first the conversion of the carbamido monosulphonic acid to sulphamic acid, and, second, the conversion of the urea bisulphate to sulphamic acid either directly or through the intermediate carbamido monosulphonic acid.

In accordance with the invention the formation of sulphamic acid is suppressed by effecting cooling during the pre-mix stage. It appears that the formation of carbamido monosulphonic acid takes place at a lower temperature than the conversion of carbamido monosulphonic acid to sulphamic acid and that if the temperature is properly controlled throughout the liquid reaction medium during the introduction of urea and oleum to form carbamido monosulphonic acid the sulphamic acid-forming reaction may be so suppressed that objectionable quantities are not introduced. The formation of urea bisulphate is suppressed in the pre-reaction stage by always having present in the pre-reaction mixture a quantity of sulphur trioxide in the pre-reaction mixture equal on a molecular basis to the sulphuric acid. To effect this the sulphuric acid and sulphur trioxide are introduced as oleum of at least 45% strength, thus assuring that there shall be at least one mole of sulphur trioxide for each mole of sulphuric acid, and this serves the additional function of preventing too large an excess of sulphur trioxide which tends to promote instability in the pre-reaction mixture. The amount of sulphur trioxide which can be dissolved in sulphuric acid effectively limits the excess of sulphur trioxide which can be present during the pre-mix reaction and, as a matter of fact, as will be more particularly pointed out hereinafter, it is desirable even further to limit the amount of sulphur trioxide which may be in excess.

In carrying out the invention there is first established and maintained throughout the first phase of the reaction a liquid reaction vehicle made up of one or more of the components of the reaction, that is, of urea, oleum, or products of the reaction such as carbamido monosulphonic acid and sulphamic acid. This is obtained in the first instance by charging the reaction vessel with a suitable quantity of oleum of desired strength and thereafter introducing the urea slowly and with sufficient applied cooling and agitation as may be required to make the cooling effective. If the temperature is maintained low enough and the factors effecting temperature such as rate of addition of urea and thoroughness of agitation are properly controlled the formation of sulphamic acid during the pre-mix may be adequately inhibited so that the product throughout the pre-mix state remains in a fluid condition. In this condition the heat of the pre-mix reaction is easily dissipated and the fluid product so obtained may easily be converted to sulphamic acid without the usual difficulties encountered in trying to make a solid product direct from combining proportions of urea, sulphuric acid and sulphur trioxide.

The pre-mix product is converted to sulphamic acid simply upon heating. On moderate heating the conversion proceeds slowly whereas on more extensive heating it may be sufficiently activated by the heat of the reaction to continue spontaneously. When it does so, however, it does not proceed with the violence characteristic of the spontaneous interaction of urea, sulphuric acid and sulphur trioxide in combining proportions and even in large-scale production it is a relatively simple matter to dissipate the heat of the reaction sufficiently that objectionable reaction temperatures do not obtain at any time. With excess sulphur trioxide in the pre-mix the temperature at which the reaction will continue spontaneously is lowered. With such excess it is easier to control the reaction and there is less likelihood of local high temperatures which would bring about decomposition of the sulphamic acid. In consequence with an excess of sulphur trioxide improved yields of sulphamic acid are obtained.

Our invention may be more fully understood with reference to the following examples in which the parts are by weight unless otherwise specified:

Example 1

In this example urea and oleum of 56% strength were reacted in the molal ratio of one mole of urea to 0.9 mole $H_2SO_4$ to 1.4 moles $SO_3$ thus providing substantially one mole of sulphuric acid for each mole of urea and a 40% excess of sulphur trioxide. Sixty parts of urea was added at an average rate of 1.2 grams per minute to 195 parts of 56% oleum while maintaining a temperature of 95–100° F. Gas was evolved throughout the addition of urea and the volume increased considerably. No difficulty was encountered in holding the temperature below 100° F. The final mixture was heavy and creamy in appearance.

One portion of the final mixture was allowed to stand overnight to determine its stability at atmospheric temperatures. Apparently nothing happened during this period. The remaining portion was heated slowly. At 110° F. a slow reaction was observed but it was necessary to continue the application of heat until 150° F. was reached at which point the reaction maintained itself gradually increasing in intensity until with a final spurt the temperature rose to 300° F. and the reaction was completed. A dry solid product was thus obtained containing 73.4% sulphamic acid.

Example 2

In this example urea was reacted with 45% oleum in the combining proportions of 1:1:1.

60.5 grams of urea was added slowly at an average rate of 1⅓ grams per minute to 178 parts of 45% oleum with agitation and while maintaining a temperature between 90 and 110° F. There was obtained a smooth viscous liquid which on being heated to 160° F. in a test tube reacted spontaneously with a final temperature of 300° F. There was obtained a hard white cake analyzing 70.4% sulphamic acid. Another portion of the pre-mix was added to an agitated batch of 82% sulphamic acid crude at an average temperature of 220° F. The resulting product analyzed 82.1% sulphamic acid.

Example 3

In this example the proportions were 1 mole of urea to 0.95 mole $H_2SO_4$ to 1.6 moles $SO_3$. 60.5 parts of urea was added at an average rate of ⅓ g. per minute to 220 g. of 58.3% oleum with agitation while maintaining a temperature between 90 and 103° F. The reaction mixture gassed badly during the reaction and became almost solid at 85° F., indicating that substantial conversion to sulphamic acid had taken place. A portion of the pre-mix was heated to 160° F. and then cooled rapidly. There was thus obtained a light, white, dry powder analyzing 83.8% sulphamic acid. Another portion was allowed to stand overnight, during which it puffed up and became dry without evidence of violence. This product analyzed 72.7% sulphamic acid.

Example 4

In this example the mole ratio was 1:1:1.32. 612 parts of 52% oleum was charged into a steel-jacketed tank having a flat-bladed steel paddle for obtaining agitation. To this there was added with agitation 181 g. of urea at an average rate of about 3 g. per minute while cooling water was passed through the jacket of the tank and the temperature was maintained at 90-102° F. One hour after the last of the urea was added the reaction mix analyzed 11.6% sulphamic acid.

A portion of the slurry thus obtained was allowed to stand overnight whereupon it became a dry, hard, solid analyzing 23% sulphamic acid. On heating the dry solid for ¾ of an hour at 200° F. a product was obtained analyzing 83.2% sulphamic acid. On heating another portion of this dry solid for 1¾ hours at 200° F. a product analyzing 85.1% sulphamic acid was obtained. On drying still another portion of this hard, dry, solid on a steam plate overnight a product analyzing 88.7% sulphamic acid was obtained.

Example 5

A pre-mix was made from urea and 56% oleum in the proportions of 1 to 0.9 to 1.4 using apparatus according to the preceding example. 242 parts of urea was added with agitation to 800 parts of 56% oleum at an average rate of about 3.2 g. per minute while maintaining a temperature of 95-102° F. There was thus obtained a liquid pre-mix containing 22.6% sulphamic acid.

400 parts crude sulphamic acid was charged into a Sigma-arm mixer and heated to 230° F. 277 parts of the pre-mix slurry was then introduced gradually into the agitated mass in the Sigma-arm mixer at a rate of about 9.2 g. per minute while maintaining the temperature of the mix between 236 and 242° F. by supplying external heat when needed. The mixing was continued for 10 minutes after the last addition of pre-mix and the final temperature was 215° F. There was thus obtained a total of 647 parts of sulphamic acid analyzing 86.6% sulphamic acid. Taking into account the 400 g. of crude added to the mixer the production calculates to a product containing 94% sulphamic acid.

Example 6

A pre-mix was made using apparatus according to the preceding example with a molal ratio of 1:1:1.15 obtained from 1140 parts of 48.4% oleum and 363 parts of urea. This pre-mix contained 7.9% sulphamic acid. 300 parts of this pre-mix was converted to sulphamic acid in a Sigma-arm mixer to which 400 parts of crude sulphamic acid had been added at a temperature of 250° F. The 653 parts of product were obtained analyzing 84.2% sulphamic acid with a calculated sulphamic acid content for the new production of 91.6%.

Example 7

A pre-mix was made using apparatus according to the preceding example with a molal ratio of 1:1:2 obtained from 1561 parts of 62% oleum and 362 parts of urea. Difficulty was encountered in maintaining a temperature between 100 and 104° F. and the slurry became very viscous. It contained 22.6% sulphamic acid. 300 parts of this pre-mix was converted to sulphamic acid in a Sigma-arm mixer to which 400 parts of crude sulphamic acid had been added while maintaining a temperature of 200-228° F. 665 parts of product were obtained analyzing 86.1 parts of sulphamic acid with a calculated sulphamic acid content for the new production of 88.3%.

While we have disclosed our invention with reference to particular embodiments thereof it will be understood that these are given by way of illustration only and that variations may be made therein without departing from the spirit and scope of the invention as long as urea and oleum of at least 45% strength are brought together in a liquid reaction medium in the proportions to give substantially one mole of sulphuric acid for each mole of urea while cooling and agitating the mass as required to keep it liquid, and thereafter converting the product to sulphamic acid.

The proportion of the reagents should be so chosen as to give substantially one mole of sulfuric acid for each mole of urea and to provide an equal molar quantity of sulphur trioxide or more. The sulphur trioxide and sulphuric acid are to be combined as oleum so that they are introduced simultaneously into the reaction mixture and such oleum must be of at least 45% strength which corresponds to one mole of $SO_3$ dissolved in one mole of sulphuric acid. An oleum strength up to 60% or over may be employed but such high concentration is undesirable because of the accelerating effect it has upon the reaction and the difficulty thereby encountered in preventing the pre-mix from reacting spontaneously especially in apparatus limited in its ability to dissipate the heat of the reaction and to prevent local overheating. On the other hand, a substantial excess of sulphur trioxide is desirable not only to compensate for losses which might occur from vaporization of sulphur trioxide or degradation by absorption of water from the atmosphere but also because an excess appears to accelerate the decomposition of the pre-mix so that it will proceed spontaneously at a lower temperature and thereby result in higher yields. Optimum results are obtained operating with between about 15 to about 40% excess $SO_3$.

The pre-mix reaction is carried out throughout in a liquid reaction medium made up of one or more of the components of the reaction. Thus the liquid reaction medium may be the oleum to which urea is gradually added with proper cooling and mixing to suppress sulphamic acid-forming reaction or the liquid reaction medium may be a heel of recycled pre-mix reaction product to which both oleum and urea are added in the proper proportions and with the proper precautions to suppress sulphamic acid-forming reaction. By thus maintaining a liquid reaction medium throughout the reaction effective heat transfer to the coolant is obtained and effective preclusion of local overheating may be avoided by proper agitation of this liquid.

The reagents should be brought together gradually in order to afford opportunity for the heat of the reaction to be dissipated. The rate at which the reagents are brought together, the rate and effectiveness of agitation and the efficiency of cooling must be balanced one against the other to obtain the desired inhibition of the sulphamic acid-forming reaction. Those skilled in the art from a consideration of the examples herein given will be able effectively to carry out the processes and to provide a suitable balance among these several factors. Ordinarily it will be best so to regulate them that the reaction mass uniformly is maintained within the temperature range of about 95 to about 105° F. though temperatures above, say up to 110° F. or more, and temperatures below these may be employed. Too low a temperature should be avoided for the purely physical reason that the pre-mix slurry becomes too viscous and too difficult to handle. It is desirable not to go below about 85° F. though lower temperatures, say about 75° F., might be permissible under particular conditions.

In bringing the reagents together care should be taken to avoid an accumulation of unreacted or undissolved urea. A build-up of an excess of urea, even locally, in some cases has been observed detrimentally to stimulate the formation of sulphamic acid and to make it difficult to control the pre-mix reaction. By the introduction of the urea into a liquid reaction medium with sufficient agitation to disperse it throughout the liquid reaction medium and to prevent it from accumulating on the surface such local excesses of urea are avoided. Also, an excess of urea throughout the reaction is avoided by introducing urea into the oleum or by introducing the urea and oleum simultaneously into a heel of recycled pre-mix reaction product. Temperatures above 85° F. also help to avoid excess of urea because urea is more easily soluble in the reaction mixture at temperatures above 85° F. The presence of a substantial excess of sulphur trioxide makes the manner of addition of the urea less critical. Thus with a 15-40% excess there is always present sufficient sulphur trioxide to aid in preventing local excesses of urea.

The conversion of the pre-mix liquid to sulphamic acid may be effected in any suitable manner since all that is required is to bring the premix to a suitable temperature at which the reaction will proceed at a practical velocity. At a temperature above 150-180° F. the reaction may proceed spontaneously according to the particular pre-mix, some being more reactive than others. Also, depending upon the conditions, it may be necessary to apply heat continuously throughout conversion or it may be necessary to abstract heat by suitable cooling. Thus it is desirable to maintain a temperature in the neighborhood of 200° F., preferably from about 180 to about 260° F. Higher temperatures should be avoided since they are conducive to the formation of impurities such as ammonium bisulphate. In converting large masses it is usually desirable to provide some cooling to prevent the reaction mass from becoming too hot and this is most suitably done by agitating the mass in contact with a temperature-controlled surface as in a graining bowl, a flaker, a Sigma-arm mixer or like apparatus or in a temperature-controlled atmosphere as in a rotary tube reactor, a space reactor and the like apparatus.

The general reaction and other aspects of the subject matter herein described are disclosed in the following coassigned applications: Ernest J. Tauch and Howard R. Wilson, filed December 31, 1942, Serial Number 470,838; Ernest J. Tauch, Serial Number 471,743, filed January 1, 1943; James W. Leonard, Serial Number 509,213, filed November 6, 1943; and Howard R. Wilson, Serial Number 509,281, filed November 6, 1943.

We claim:

1. In the manufacture of sulphamic acid the steps of bringing together urea and oleum of at least 45% strength in the proportions to give substantially one mole of sulphuric acid for each mole of urea in a liquid reaction medium made up of components of the sulphamic acid-forming reaction while effecting cooling throughout the liquid reaction medium adequate to inhibit the formation of sulphamic acid and to maintain the reaction medium liquid and thereafter converting the liquid mass to sulphamic acid.

2. In the manufacture of sulphamic acid the steps of bringing together urea and oleum in the proportions to give substantially one mole of sulphuric acid for each mole of urea in a liquid reaction medium made up of components of the sulphamic acid-forming reaction while effecting cooling adequate to inhibit formation of sulphamic acid and to maintain the reaction medium liquid throughout and thereafter converting the liquid mass to sulphamic acid, the strength of the oleum being sufficient to provide at least about 15 and not more than about 40% $SO_3$ in excess of that required to produce the sulphamic acid.

3. In the manufacture of sulphamic acid the steps of bringing together urea and oleum of at least 45% strength in the proportions to give substantially one mole of sulphuric acid for each mole of urea in a liquid reaction medium made up of components of the sulphamic acid-forming reaction while effecting cooling throughout the liquid reaction medium adequate to maintain a temperature between about 75° F. and about 110° F. throughout the reaction mass during the reaction and thereafter converting the resulting product to sulphamic acid.

4. In the manufacture of sulphamic acid the steps of bringing together urea and oleum in the proportions to give substantially one mole of sulphuric acid for each mole of urea in a liquid reaction medium made up of components of the sulphamic acid-forming reaction while effecting cooling adequate to maintain a temperature between about 75° F. and about 110° F. throughout the reaction mass during the reaction and thereafter converting the resulting product to sulphamic acid, the strength of the oleum being sufficient to provide at least about 15 and not more than about 40% $SO_3$ in excess of that required to produce the sulphamic acid.

5. In the manufacture of sulphamic acid the steps of bringing together urea and oleum of at least 45% strength in the proportions to give substantially one mole of sulphuric acid for each mole of urea in a liquid reaction medium made up of components of the sulphamic acid-forming reaction while effecting cooling throughout the liquid reaction medium adequate to maintain a temperature between about 95° F. and about 105° F. throughout the reaction mass during the reaction and thereafter converting the resulting product to sulphamic acid.

6. In the manufacture of sulphamic acid the steps of bringing together urea and oleum in the proportions to give substantially one mole of sulphuric acid for each mole of urea in a liquid reaction medium made up of components of the sulphamic acid-forming reaction while effecting cooling adequate to maintain a temperature between about 95° F. and about 105° F. throughout the reaction mass during the reaction and thereafter converting the resulting product to sulphamic acid, the strength of the oleum being sufficient to provide at least about 15 and not more than about 40% $SO_3$ in excess of that required to produce the sulphamic acid.

7. In the manufacture of sulphamic acid the steps of continuously bringing urea into contact with oleum of at least 45% strength in a liquid reaction medium made up of components of the sulphamic acid-forming reaction while effecting cooling adequate to inhibit formation of sulphamic acid and to maintain the reaction mass in a liquid state throughout the reaction, the proportions being such that when the reaction is complete there shall have been brought together not substantially more than one mole of sulphuric acid for each mole of urea and thereafter converting the resulting product to sulphamic acid.

8. In the manufacture of sulphamic acid the steps of continuously bringing urea into contact with oleum in a liquid reaction medium made up of components of the sulphamic acid-forming reaction while effecting cooling adequate to inhibit formation of sulphamic acid and to maintain the reaction mass in a liquid state throughout the reaction, the proportions being such that when the reaction is complete there shall have been brought together not substantially more than one mole of sulphuric acid for each mole of urea, and thereafter converting the resulting product to sulphamic acid, the strength of the oleum being sufficient to provide at least about 15 and not more than about 40% $SO_3$ in excess of that required to produce the sulphamic acid.

9. In the manufacture of sulphamic acid the steps of bringing together urea and oleum of at least 45% stregth in a liquid reaction medium made up of components of the sulphamic acid-forming reaction, the proportion of urea to oleum being such as to give substantially one mole of sulphuric acid and at least one mole of urea and the manner of addition being such that urea is not present in the reaction mixture at any time substantially in excess of one mole per mole of sulphuric acid while effecting cooling throughout the reaction medium adequate to inhibit the formation of sulphamic acid and to maintain the reaction medium liquid throughout and thereafter converting the liquid mass to sulphamic acid.

10. In the manufacture of sulphamic acid the steps of bringing together urea and oleum in a liquid reaction medium made up of components of the sulphamic acid-forming reaction, said urea and oleum being brought together in the proportions to give substantially one mole of sulphuric acid and from 1.15 to 1.4 moles of sulphur trioxide for each mole of urea and said liquid reaction medium being free throughout the reaction of any substantial amount of urea over one mole per mole of sulphuric acid, effecting cooling throughout the reaction adequate to inhibit formation of sulphamic acid and to maintain the reaction medium liquid throughout and thereafter converting the liquid mass to sulphamic acid.

DONALD P. HILL.
GEORGE A. PEIRCE.